(12) United States Patent
Yang

(10) Patent No.: US 8,048,554 B2
(45) Date of Patent: *Nov. 1, 2011

(54) BATTERY PACK COOLING SYSTEM FOR VEHICLE

(75) Inventor: Jae Hun Yang, Daejeon (KR)

(73) Assignee: LG Chem, Ltd. (KR)

( * ) Notice: Subject to any disclaimer, the term of this patent is extended or adjusted under 35 U.S.C. 154(b) by 617 days.

This patent is subject to a terminal disclaimer.

(21) Appl. No.: 11/507,160

(22) Filed: Aug. 21, 2006

(65) Prior Publication Data

US 2007/0196728 A1 Aug. 23, 2007

(30) Foreign Application Priority Data

Sep. 2, 2005 (KR) .................. 10-2005-0081477

(51) Int. Cl.
 *H01M 10/50* (2006.01)
 *B60R 16/04* (2006.01)
 *B60K 11/06* (2006.01)
(52) U.S. Cl. ................. 429/120; 180/68.5; 180/68.1
(58) Field of Classification Search .......... 429/120; 55/486
 See application file for complete search history.

(56) References Cited

U.S. PATENT DOCUMENTS

| | | | |
|---|---|---|---|
| 2,104,766 A * | 1/1938 | Saunders | 180/68.5 |
| 5,585,204 A | 12/1996 | Oshida et al. | |
| 6,185,934 B1 * | 2/2001 | Teboul | 60/297 |
| 6,541,151 B2 * | 4/2003 | Minamiura et al. | 429/98 |
| 6,645,666 B1 | 11/2003 | Moores, Jr. et al. | |
| 6,797,042 B2 * | 9/2004 | LaFerriere et al. | 95/273 |
| 2005/0008912 A1 | 1/2005 | Yang et al. | |
| 2005/0095499 A1 * | 5/2005 | Kanai et al. | 429/83 |
| 2006/0172188 A1 * | 8/2006 | Okuda et al. | 429/120 |

FOREIGN PATENT DOCUMENTS

| | | |
|---|---|---|
| JP | 2004130910 A | 4/2004 |
| JP | 2004273311 | 9/2004 |
| KR | 100202509 | 3/1999 |
| KR | 1020000010128 A | 2/2000 |
| KR | 1020010057628 A | 7/2001 |
| KR | 1020050002408 | 1/2005 |
| KR | 1020060072922 | 6/2006 |

* cited by examiner

*Primary Examiner* — Keith Walker
(74) *Attorney, Agent, or Firm* — Cantor Colburn LLP

(57) ABSTRACT

Disclosed herein is a cooling system for vehicle battery packs, including a double filter device mounted at an air inlet part, through which air for cooling the battery pack is introduced from the outside and/or the inside of the vehicle. The double filter includes a pre-filter having relatively large air holes, the pre-filter having high frequency of replacement, and a medium filter having relatively small air holes, the medium filter having low frequency of replacement. The pre-filter is located before the medium filter in the direction in which the air is introduced. Consequently, dust is removed from air, and therefore, the cooling efficiency of the battery pack is increased. In a preferred structure, metal dust is also effectively removed by the magnetic force applied to the medium filter. Consequently, the malfunction or short circuits of the battery pack are prevented. Also, air surrounding the battery pack is directly introduced through the through-type intake ports without passing through any pipe-shaped intake duct. Consequently, generation of noise, which is a problem caused when air in the cabin is used, and backward flow of flames and toxic gas, which are generated during a fire, are prevented. Furthermore, the battery pack is constructed in a compact structure.

6 Claims, 5 Drawing Sheets

BATTERY PACK COOLING SYSTEM FOR VEHICLE

FIELD OF THE INVENTION

The present invention relates to a cooling system for vehicle battery packs, which are used as a power source for electric vehicles and hybrid electric vehicles, and, more particularly, to a cooling system for vehicle battery packs, including a pre-filter having high frequency of replacement and a medium filter having low frequency of replacement, which are successively mounted at an air inlet part, through which air for cooling the battery pack is introduced from the outside or the inside of the vehicle, thereby effectively removing dust from the air, and therefore, preventing reduction of the cooling efficiency due to excessive accumulation of the dust, and preventing the malfunction or short circuits of the battery pack due to contamination of an electrical connecting part and a circuit board.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a battery module, and a plurality of battery modules are connected in parallel or in series with each other so as to construct a battery pack.

In such a high-output, large-capacity secondary battery, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for vehicle battery packs, which are high-output, large-capacity secondary batteries.

Generally, a cooling system for vehicle battery packs is constructed in an air-cooling structure using air as a coolant. In the air-cooling structure, air outside or inside the vehicle is introduced to cool the battery pack, and is then discharged out of the vehicle. For example, the cooling system may be constructed in a structure in which an air inlet part, through which air is introduced from a specific region outside or inside the vehicle, and an air outlet part, through which the air having passed through the battery pack, which has been heated, is discharged out of the vehicle, are mounted at a housing (a case), which surrounds the outer surface of the battery pack, and air is circulated by the driving force of a cooling fan such that the battery pack can be cooled by the circulated air.

In the case that air outside the vehicle is used as air for cooling the battery pack, it is necessary to control the temperature and the humidity of the air. Consequently, it is preferable to use air inside the vehicle, the temperature and the humidity of which are controlled at a specific level.

The air inside the vehicle, as well as the air outside the vehicle, contains fine dust, although there is a little difference between them. Such dust may cause a serious problem especially in a fuel cell, which uses air as one of material components for battery operation. For this reason, U.S. Unexamined Patent Publication No. 2005-8912 and Japanese Unexamined Patent Publication No. 2004-273311 disclose technologies for effectively removing dust by means of a filter mounted at an air supply unit of a fuel cell.

As previously described, air is used to cool the secondary battery pack. Consequently, seriousness of problems due to dust in the case of the battery pack is lower than that in the case of the fuel cell. However, when such fine dust is introduced into the battery pack along with the air, and, as a result, the dust is excessively accumulated on unit cells of the battery pack, the cooling efficiency is decreased. Furthermore, when metal dust component among the fine dust is accumulated on an electrical connecting part and a circuit board of the battery pack, the malfunction or short circuits of the battery pack may be caused.

Consequently, Korean Registered Patent No. 494936 discloses a technology for removing dust by means of a filter mounted at an air inlet part of the battery pack, and Korean Registered Patent No. 202509 discloses a technology for removing dust and moisture by means of a filter mounted at the rear of a cooling fan of the battery pack.

The above-mentioned patents disclose the provision of the filter for removing the dust. However, the detailed construction of the filter is not disclosed in the patents. It can be understood from the review of the patent specifications that a single filter is mounted to remove dust. In this case, various-sized dust is filtered by the single filter with the result that the filter replacing cycle is very short. Also, an expensive filter is needed to filter fine dust. Especially, it is difficult to remove metal dust, which may cause the malfunction or short circuits of the battery pack.

Meanwhile, the vehicle battery pack must be mounted in a restricted space in the vehicle, and therefore, it is preferable that the vehicle battery pack be constructed in a compact structure. The size of the vehicle battery pack is decided depending upon the size of the battery module, which is constructed by stacking unit cells one on another, and the size of the cooling system, which covers the outer surface of the battery pack. In connection with this case, the above-mentioned prior arts essentially include an intake duct for introducing air from the outside of the vehicle or the cabin into the battery pack and an exhaust duct for discharging the air having passed through the battery pack, which has been heated, out of the vehicle. These ducts have a predetermined size, and therefore, the ducts serve as a principal factor deciding the size of the battery pack based on the cooling system for the battery module with the same condition.

SUMMARY OF THE INVENTION

Therefore, the present invention has been made to solve the above-mentioned problems, and other technical problems that have yet to be resolved.

Specifically, it is a first object of the present invention to provide a cooling system for vehicle battery packs that is capable of improving the cooling efficiency of the battery pack through the use of a double filter device that can filter fine dust contained in air.

It is a second object of the present invention to provide a cooling system for vehicle battery packs that is capable of effectively filtering metal dust contained in air, thereby greatly reducing a possibility of the malfunction or short circuits of the battery pack.

It is a third object of the present invention to provide a cooling system for vehicle battery packs that uses air existing at a region around the battery pack as a coolant in addition to the use of the double filter device and constructed such that air having passed through the battery pack, which has been heated, is discharged into an internal space of the vehicle, in which a possibility of air to be recirculated to the region around the battery pack is low, whereby the temperature and the humidity of the air is easily controlled as compared to the case that air outside the battery pack is used as the coolant, generation of noise, which is a problem caused when air in a cabin of the vehicle is used, and backward flow of flames and toxic gas, which are generated during a fire, are prevented, and the cooling efficiency of the battery pack is increased without using any pipe-shaped intake duct.

In accordance with the present invention, the above and other objects can be accomplished by the provision of a cooling system for vehicle battery packs, including a double filter device mounted at an air inlet part, through which air for cooling the battery pack is introduced from the outside and/or the inside of the vehicle, wherein the double filter comprises: a pre-filter having relatively large air holes, the pre-filter having high frequency of replacement; and a medium filter having relatively small air holes, the medium filter having low frequency of replacement, the pre-filter being located before the medium filter in the direction in which the air is introduced.

The cooling system for vehicle battery packs according to the present invention includes the double filter device comprising the pre-filter and the medium filter. The pre-filter, which is relatively inexpensive and has the relatively large air holes, is replaced with high frequency. Consequently, the replacing cycle of the double filter device is extended, and therefore, the operation costs of the cooling system are reduced.

The replacing frequency and the size of air holes for the pre-filter are relative to the replacing frequency and the size of air holes for the medium filter. Also, the pre-filter is disposed before the medium filter such that large-sized dust can be filtered by the pre-filter. As a result, the replacing cycle of the medium filter is further extended.

In a preferred embodiment, a magnetic force may be applied to the filters such that metal dust can be effectively collected by the filters. The magnetic force may be generated from a permanent magnet or an electromagnet, although the present invention is not limited to the permanent magnet or the electromagnet. Generally, the metal dust has very small sizes. Consequently, it is necessary to use a filter having very small air holes so as to effectively remove the metal dust. However, the filter having very small air holes is very expensive. Furthermore, the flow speed of air is decreased when the filter having very small air holes is used, and therefore, the cooling efficiency of the battery pack is decreased. On the other hand, when even a small amount of metal dust is introduced to an electrically connecting part or a circuit board of the battery pack, the malfunction or short circuits of the battery pack may be caused.

Consequently, in a preferred embodiment of the present invention, the metal dust is removed by the magnetic force applied to the filters, whereby the above-mentioned problems are solved. The magnetic force may be selectively applied to the pre-filter or the medium filter. Alternatively, the magnetic force may be selectively applied to both the pre-filter and the medium filter.

The magnetic force for collecting the metal dust may be applied to a region where the filters are not mounted, for example, to an arbitrary region of the intake duct. However, high magnetic force is required to separate metal dust from air introduced to cool the battery pack because the flow speed of the air is high in the intake duct, which is constructed in a hollow structure. In the structure the magnetic force is applied to the pre-filter and/or the medium filter according to the present invention, on the other hand, the flow speed of the metal dust is reduced while the metal dust collides with filtering nets of the filters. Consequently, it is possible to effectively collect the metal dust although the magnetic force is small. Furthermore, the collected metal dust sticks to the filtering nets of the filters together with other kinds of dust, and therefore, a possibility of the metal dust to be separated from the filters and be introduced into the battery pack is low.

The material for the pre-filter and the medium filter is not particularly restricted so long as the pre-filter and the medium filter have pluralities of air holes, through which air can pass, under the above-defined conditions. For example, the pre-filter and the medium filter may be made of non-woven cloth. In the structure in which the magnetic force is applied to the filters as described above, the pre-filter and/or the medium filter may be partially or entirely made of a conductive material so as to increase the collecting efficiency.

The location of the air inlet part, where the double filter device is mounted, is not particularly restricted so long as the air inlet part is a part of the cooling system that introduces cooling air into the battery pack from the outside and/or the inside of the vehicle. For example, the double filter device may be mounted to an arbitrary position of the intake duct, which is a pipe-shaped member.

In a preferred embodiment, the cooling system may be constructed such that air existing inside the vehicle at a region around the battery pack isolated from a cabin of the vehicle is directly introduced into the battery pack through through-type intake ports without passing through a pipe-shaped intake duct, and the air having passed through the battery pack, which has been heated, is discharged through an exhaust duct connected to an internal space of the vehicle, in which a possibility of air to be recirculated to the region around the battery pack is low, whereby the total size of the cooling system is further decreased. In this case, the double filter device may be mounted at the front or the rear of the intake ports. According to circumstances, the pre-filter may be mounted at the front of the intake ports, and the medium filter may be mounted at the rear of the intake ports.

In the cooling system with the above-stated construction, air existing at the region around the battery pack is used as a coolant, and the air is directly introduced into the battery pack through the through-type intake ports. Consequently, it is possible to cool the battery pack without using the pipe-shaped intake duct, which is bulky, and therefore, the total size of the cooling system is further decreased.

In a preferred embodiment, the cooling system comprises: a closed type housing for surrounding the outer surface of the battery pack, which includes unit cells; a plurality of intake ports formed in the housing at regions corresponding to the unit cells, the double filter device being mounted at the front or the rear of the intake ports; an exhaust duct connected to the housing at a region opposite to the intake ports; and a cooling fan mounted to the exhaust duct.

In the above-described construction, the air pressure inside the housing is reduced due to the operation of the cooling fan, and therefore, air existing at the region around the battery pack is introduced into the housing through the intake ports so as to compensate for the reduced air pressure. The intake ports are formed in the housing in the shape of a through-hole. Consequently, an intake duct, which is necessary for the prior arts, is not needed, and therefore, the battery pack can be manufactured in a compact structure.

The battery pack is mounted in a specific region isolated from the cabin in consideration of various factors, such as the safety and the operating efficiency, of the vehicle. For example, the battery pack may be mounted in a trunk, which is located at the rear of the vehicle. According to the design of the vehicle, the battery pack mounting region, in which the battery pack is mounted, may be constructed in a fully isolated structure, in which the flow of air from the cabin is fully interrupted, or in a partially isolated structure, in which a small amount of air is allowed to flow. As a result of experiments, the inventors of the present application have confirmed that, even when the battery pack mounting space is completely isolated from the cabin of the vehicle, a specific amount of air flows between the inside and the outside of the battery pack mounting space due to the structure of the vehicle, and this air flow is sufficient for cooling the battery pack. Especially, the air flow at the region around the battery pack is further increased as a result of the forced discharge of air performed by the cooling fan.

According to the present invention, the air having passed through the battery pack, which has been heated, is discharged into the internal space of the vehicle, in which a possibility of air to be recirculated to the region around the battery pack is low. As a typical example, the internal space of the vehicle may be a space defined between an inner panel and an outer panel of the vehicle. Generally, panels are attached to the inner and outer parts of the vehicle on a frame of the vehicle, which provides mechanical strength, whereby the vehicle is formed in a predetermined shape. Consequently, a specific space is defined between the inner panel and the outer panel of the vehicle. This specific space is provided at the opposite side parts, the front part, and the rear part of the vehicle. Also, the specific space directly or indirectly communicates with the outside and/or the inside of the vehicle.

In a preferred embodiment, the exhaust duct of the cooling system is connected to the space defined between the inner panel and the outer panel of the vehicle, and therefore, the air having passed through the battery pack, which has been heated, is discharged into the above-described space, where some of the air is completely discharged out of the vehicle, and the remaining of the air is recirculated into the vehicle. For the air recirculated into the vehicle, the air is cooled again while the air passes through the space. Consequently, it has been confirmed that the air returned to the region around the battery pack has conditions suitable for cooling.

The battery pack according to the present invention may be constructed with a battery module having unit cells, which are mechanically coupled and electrically connected with each other in various forms. In a preferred embodiment, the battery pack may be manufactured with a battery module constructed by mounting one or more plate-shaped unit cells in a cartridge and successively stacking a plurality of cartridges. A typical example of such a battery module is disclosed in Korean Patent Application No. 2004-111699, which has been filed in the name of the applicant of the present patent application. The disclosure of the above-mentioned patent application is hereby incorporated by reference as if fully set forth herein.

The unit cells are not particularly restricted so long as the unit cells are batteries that can be charged and discharged. For example, each of the unit cells is a secondary battery including cathodes, anodes, separators, and an electrolyte mounted in a container, which is hermetically sealed in a structure in which the charge and the discharge of each unit cell is possible. Preferably, the unit cells may be lithium-ion secondary batteries, lithium-ion polymer secondary batteries, or nickel-metal hydride batteries.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
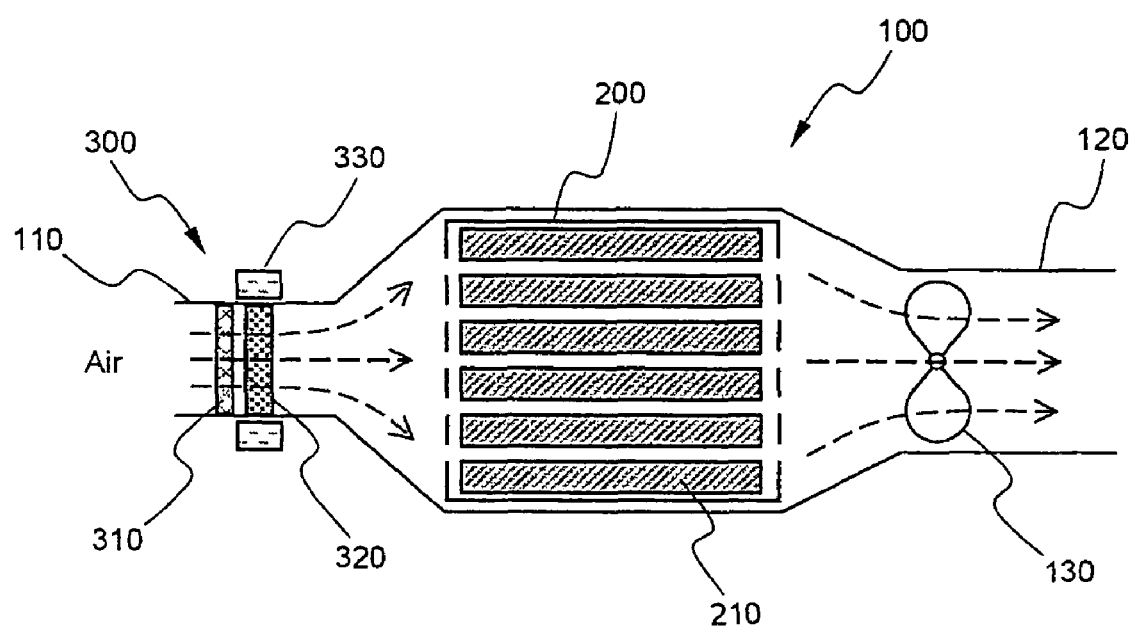
FIG. 1 is a typical view illustrating the structure of a cooling system for vehicle battery packs according to a preferred embodiment of the present invention.

FIG. 1 is a typical view illustrating the structure of a cooling system for vehicle battery packs according to a preferred embodiment of the present invention.

Referring to FIG. 1, the cooling system 100 comprises a front air inlet part 110, through which air is introduced toward a battery pack 200 including a plurality of unit cells 210, a rear air outlet part 120, through which the air having passed through the battery pack 200, which has been heated, is discharged, and a cooling fan 130 for driving air to be introduced and discharged.

At the air inlet part 110 is mounted a double filter device 300 comprising a pre-filter 310 having relatively large air holes and a medium filter 320 having relatively small air holes. A magnet 330 is mounted around the medium filter 320 such that a magnetic force can be applied to the medium filter 320.

Consequently, when air is introduced into the cooling system through the air inlet part 110 by the driving force of the cooling fan 130, large-sized dust in the air is filtered by the pre-filter 310, and small-sized dust and metal dust are collected by the medium filter 320. As a result, only air containing no dust therein passes through the battery pack 200, whereby the battery pack 200 is cooled.

Figure 2:
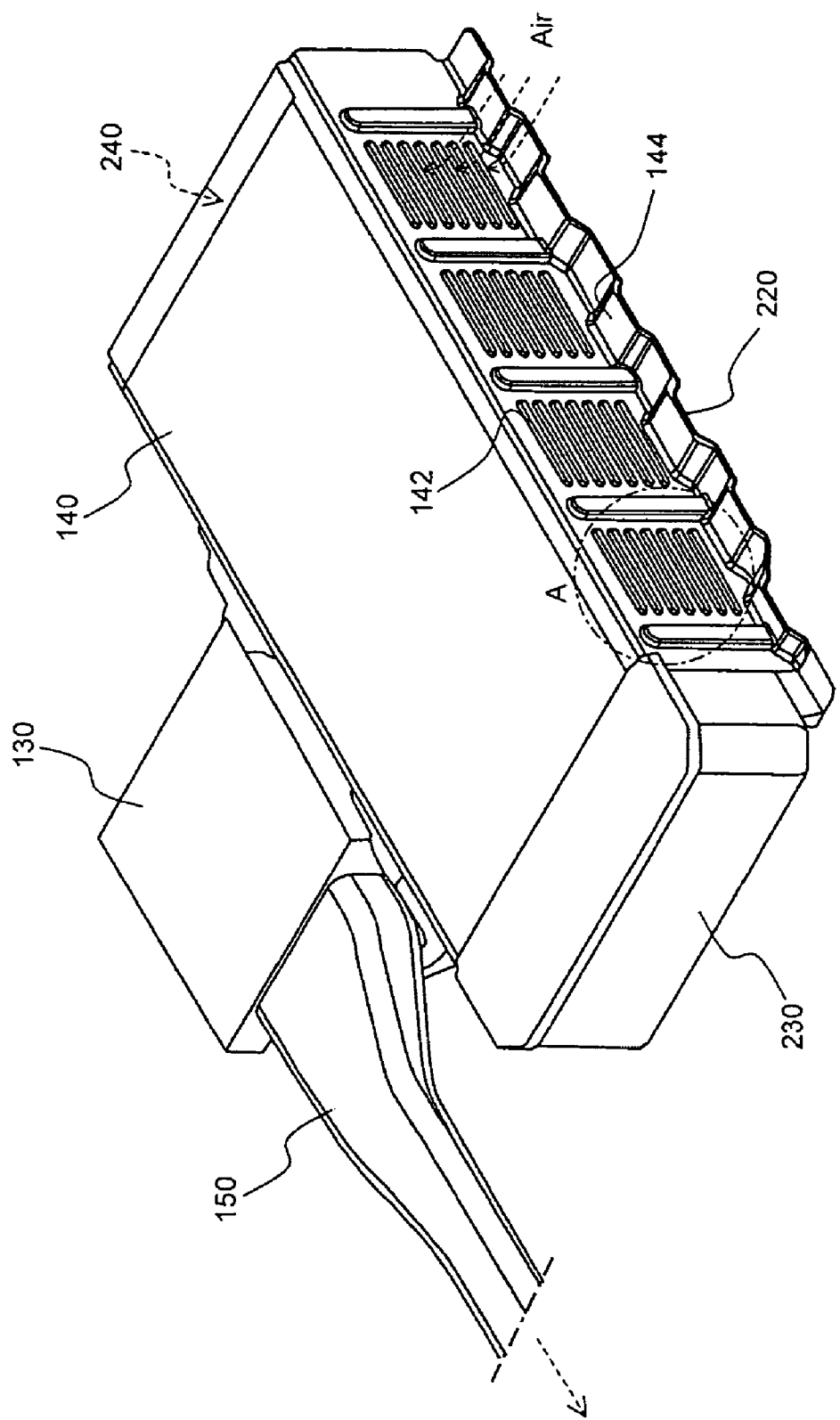
FIGS. 2 and 3 are perspective views typically illustrating a cooling system for vehicle battery packs according to another preferred embodiment of the present invention.
Figure 3:
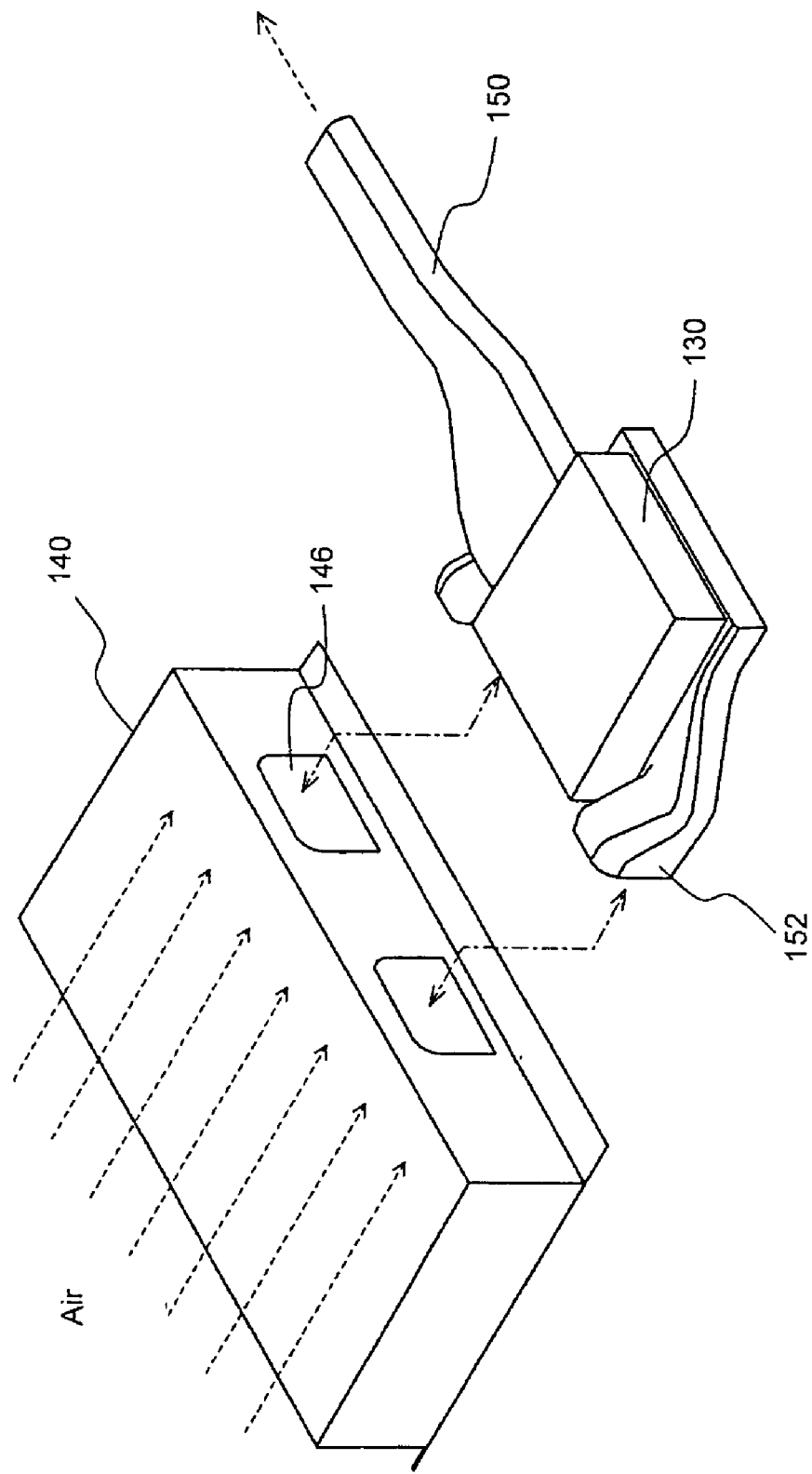

FIGS. 2 and 3 are perspective views typically illustrating a cooling system for vehicle battery packs according to another preferred embodiment of the present invention.

Referring to these drawings, the cooling system 100 includes a housing 140, which covers the outer surface of a battery pack (not shown), a cooling fan 130, and an exhaust duct 150. The housing 140 is closed except for the front surface thereof, at which through-type intake ports 142 are formed, and the rear surface thereof, to which a pair of exhaust ports 152 are connected.

Each intake port 142 is constructed in the shape of a slit, which corresponds to each plate-shaped unit cell of the battery pack. In this embodiment, a plurality of intake ports 142 are provided in correspondence to the respective unit cells. Consequently, air is introduced through the intake ports 142 for the respective unit cells, and passes through the battery pack approximately in a straight line, with the result that the cooling efficiency of the cooling system is very high. Also, the upper part of each intake port 142 is constructed in a skirt structure, by which foreign matter is prevented from being introduced into each intake port 142 from above. Consequently, as indicated by an arrow shown in FIG. 2, the air is introduced into the intake ports 142 while the air is slightly inclined upward.

Figure 4:
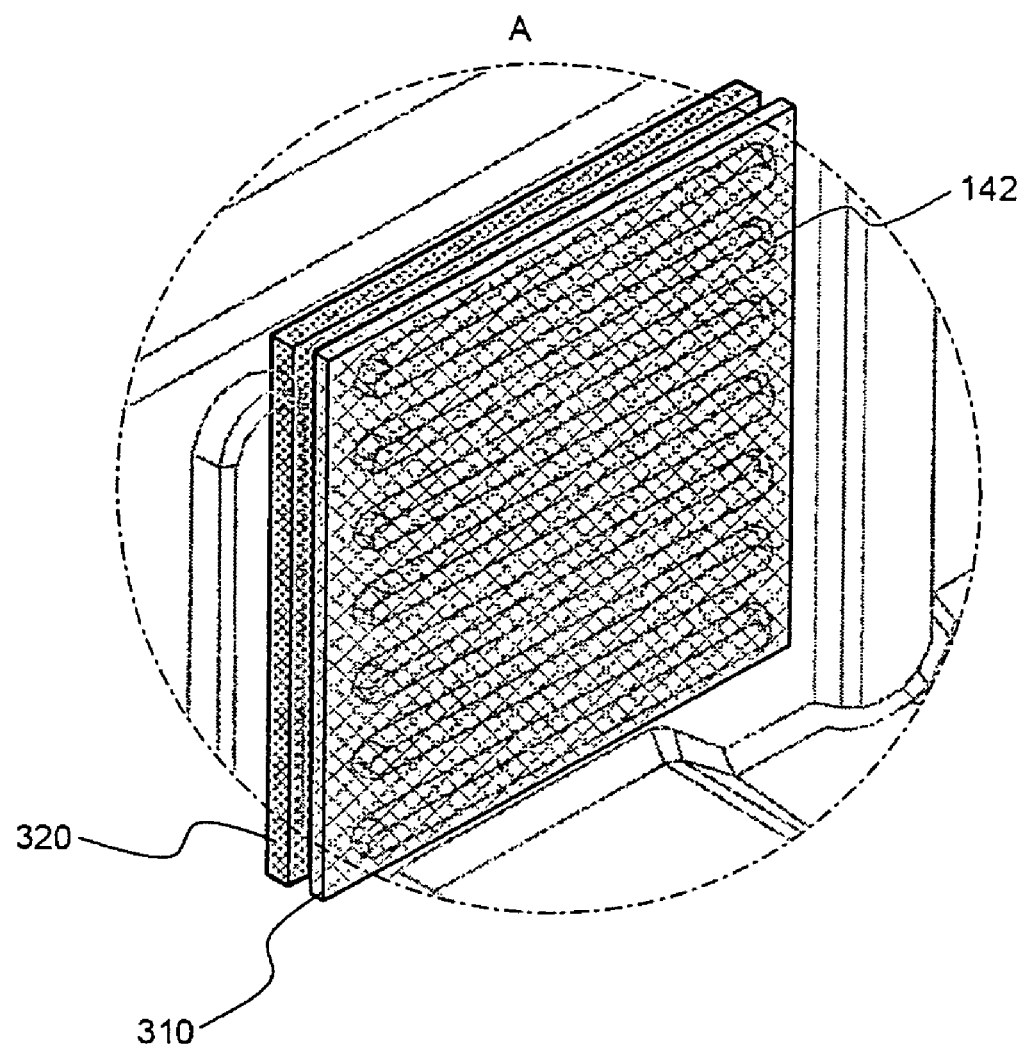
FIG. 4 is an enlarged see-through view of the part A shown in FIG. 2.

In order to remove dust contained in the air introduced into the intake ports 142 in spite of the upper skirt structure, a double filter device is mounted at the front and/or the rear of the intake ports 142. The double filter device is shown in FIG. 4, which is an enlarged see-through view of the part A shown in FIG. 2. Referring to FIG. 4, a pre-filter 310 and a medium filter 320 are successively mounted at the rear of the slit-type intake ports 142, each of which has a skirt formed at the upper part thereof, while the pre-filter 310 and the medium filter 320 are in tight contact with each other. Each intake port 142 is formed generally in the shape of a through-hole. Air surrounding the battery pack is directly introduced through the intake ports 142, and therefore, any additional intake duct is not required.

Referring back to FIGS. 2 and 3, the battery pack may be preferably mounted in a trunk of the vehicle or the rear part of a rear seat of the vehicle. A lower plate of the vehicle is constructed generally in a bent structure to increase the structural strength of the vehicle. Consequently, in the case that, as shown in FIG. 2, a base plate 220 of the battery pack is constructed in a bent structure corresponding to the bent structure of the lower plate of the vehicle, it is possible to stably mount the battery pack and to further lower the height at which the battery pack is mounted. As shown in FIG. 2, a lower end 144 of the housing 140, which is coupled to the base plate 220 of the battery pack, is also constructed in a bent structure. Consequently, the height at which the cooling system 100 is mounted is further lowered. Preferably, the base plate 220 is made of an insulating material, and therefore, the possibility of short circuits of the battery pack with respect to the vehicle is further decreased.

At the rear surface of the housing 140, which is opposite to the intake ports 142, are formed two exhaust holes 146, which are connected to the exhaust ports 152 of the exhaust duct 150. FIG. 3 shows a process of connecting the exhaust ports 152 of the exhaust duct 150 to the exhaust holes 146 of the housing 140.

The cooling fan 130, which is mounted on the exhaust duct 150, provides a driving force, by which air surrounding the battery pack is introduced into the battery pack through the intake ports 142, cools the battery pack, and is discharged from the battery pack through the exhaust duct 150. The exhaust duct 150 is connected to a space defined between an outer panel and an inner panel of the vehicle, as shown in FIG. 1.

The construction of the battery pack will be further described below.

At the right side of the battery pack is located a junction module 230 for withdrawing power from the battery pack or interrupting the withdrawal of power from the battery pack. At the left side of the battery pack is located a battery management system (BMS) module 240 for monitoring temperature of the battery pack and voltages of the unit cells. Since the junction module 230 and the BMS module 240 are located at the opposite sides of a battery module comprising the unit cells, an air flow channel for cooling the unit cells is formed in a straight line having the minimum distance, and the total height of the battery pack is greatly reduced.

The BMS module 240 serves to transmit the monitored information to an operation system of the vehicle. According to circumstances, the BMS module 240 may be constructed such that the BMS module 240 can control the operation of the battery pack according to the monitored information. Consequently, the cooling fan 130, which controls the temperatures of the unit cells, may be constructed such that the operation of the cooling fan 130 can be automatically controlled by the BMS module 240.

Figure 5:
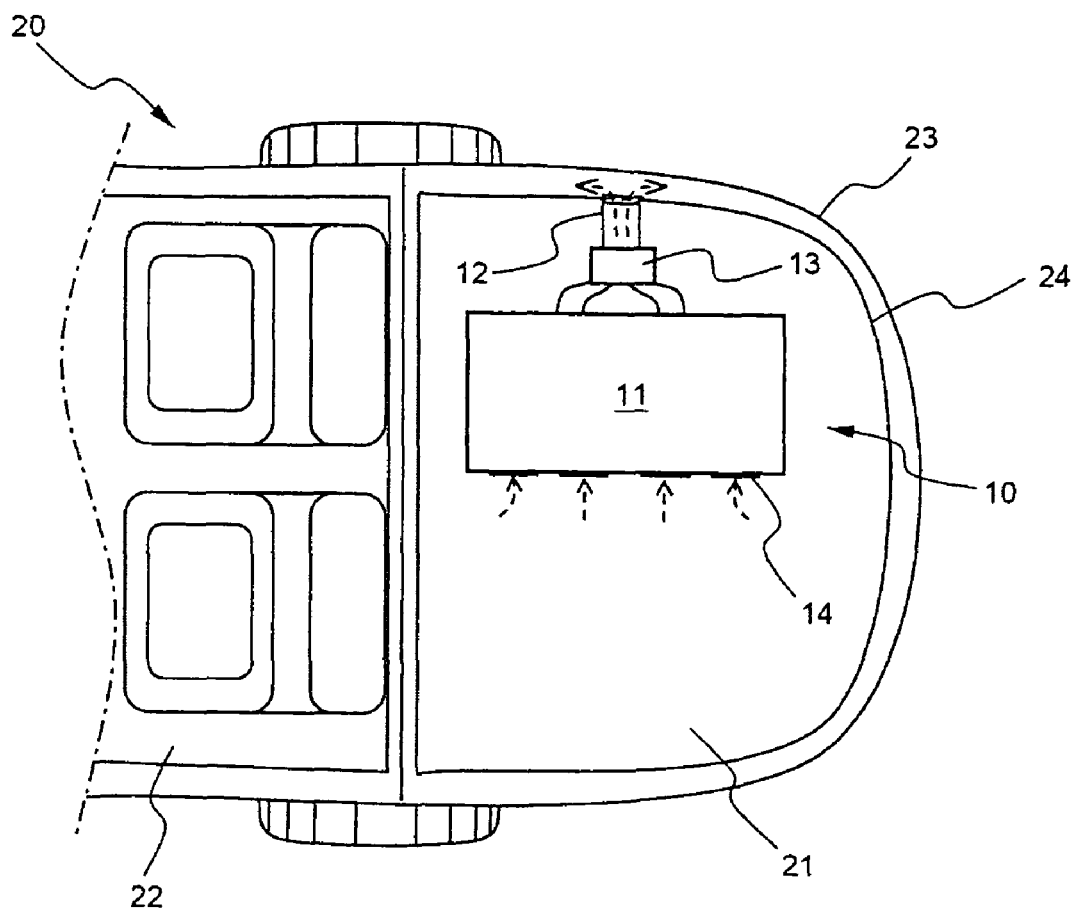
FIG. 5 is a typical view, partially in section, illustrating the internal structure of a vehicle, in which a battery pack is mounted in accordance with an embodiment of the present invention.

Referring to FIG. 5, the battery pack (11) is mounted in a trunk (21) of the vehicle (20), which is isolated from a cabin (22) of the vehicle (20). Consequently, noise generated during the operation of the battery pack (11) is not transmitted to the cabin (22).

The battery pack (11) includes unit cells and an operation circuit unit. The outer surface of the battery pack (11) is covered by a cooling system (10), which includes an exhaust duct (12) and a cooling fan (13). Air for cooling the battery pack (11) is air flowing around the battery pack (11). For this reason, the cooling system does not need an intake duct. Such surrounding air is introduced into the cooling system (10) through a plurality of intake ports (14) formed at the region of the cooling system (10) where the unit cells are mounted. The air introduction driving force is generated by a cooling fan (13).

The exhaust duct (12) is disposed opposite to the intake ports (14). The exhaust duct (12) is connected to a space defined between an outer panel (23) and an inner panel (24) of the vehicle (20). Consequently, air surrounding the battery pack (11) is introduced into the cooling system (10) through the intake ports (14) by the driving force of the cooling fan (13) so as to cool the unit cells, and is then discharged into the space defined between the outer panel (23) and the internal panel (24) through the exhaust duct (12). Some of the air, which has been heated and then discharged into the space defined between the outer panel (23) and the internal panel (24), is discharged out of the vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the double filter device, which comprises the pre-filter and the medium filter, is mounted at the air inlet part of the cooling system for battery packs according to the present invention. Consequently, dust is removed from air, and therefore, the cooling efficiency of the battery pack is increased. In a preferred structure, metal dust is also effectively removed by the magnetic force applied to the medium filter. Consequently, the malfunction or short circuits of the battery pack are prevented. In another preferred structure, air surrounding the battery pack is directly introduced through the through-type intake ports without passing through any pipe-shaped intake duct. Consequently, generation of noise, which is a problem caused when air in the cabin is used, and backward flow of flames and toxic gas, which are generated during a fire, are prevented. Furthermore, the battery pack is constructed in a compact structure.

The cooling system according to the present invention is applicable to a battery pack for various kinds of vehicles, such as electric vehicles and hybrid electric vehicles. Especially, the cooling system according to the present invention is preferably applicable to a battery pack for hybrid electric vehicles.

What is claimed is:

1. A cooling system for vehicle battery packs, including:
a double filter device mounted at an air inlet part, through which air for cooling the battery packs is introduced from an inside of the vehicle, the battery packs including a battery module constructed by mounting one or more plate-shaped unit cells in a cartridge, and successively stacking a plurality of the cartridge;
wherein the double filter comprises:
a pre-filter having relatively large air holes, the pre-filter having high frequency of replacement; and
a medium filter having relatively small air holes, the medium filter having low frequency of replacement,
the pre-filter being located before the medium filter in the direction in which the air is introduced,
wherein the cooling system is constructed such that
the air existing inside of the vehicle at a region around the battery pack isolated from a cabin of the vehicle, is directly introduced into the battery pack through intake ports without passing through a pipe-shaped intake duct, and
the air having passed through the battery pack, which has been heated, is discharged through an exhaust duct connected to an internal space of the vehicle not at the region around the battery pack isolated from the cabin of the vehicle, in which a possibility of air to be recirculated to the region around the battery pack is low, and the double filter device is mounted between the unit cells and the intake ports, and
wherein the internal space of the vehicle is a space defined between an inner panel and an outer panel of the vehicle.

2. The cooling system according to claim 1, wherein the battery pack is mounted in a trunk, which is located at the rear of the vehicle.

3. The cooling system according to claim 1, wherein the upper part of each intake port is constructed in a skirt structure, by which the introduction of foreign matter is prevented.

4. The cooling system according to claim 1, wherein the pre-filter and the medium filter are successively mounted at the rear of the intake ports while the pre-filter and the medium filter are in tight contact with each other.

5. The cooling system according to claim 1, further comprising:
a closed housing surrounding an outer surface of the battery packs including the plate-shaped unit cells;
a plurality of intake ports in the housing at regions adjacent to the plate-shaped unit cells, the double filter device being mounted between the plate-shaped unit cells and the intake ports;
an exhaust duct connected to the housing at a region opposite to the intake ports; and
a cooling fan mounted to the exhaust duct.

6. The cooling system of claim 5, wherein each of the intake ports is in the shape of a slit, which corresponds to each plate-shaped unit cell of the battery packs, and the intake ports are located in correspondence to the respective plate-shaped unit cells.

* * * * *